US012590192B2

(12) United States Patent
Honda et al.

(10) Patent No.: US 12,590,192 B2
(45) Date of Patent: Mar. 31, 2026

(54) FIBRE-REINFORCED RESIN, POROUS STRUCTURE, AND MOLDED MEMBER

(71) Applicant: TORAY INDUSTRIES, INC., Tokyo (JP)

(72) Inventors: Takumi Honda, Iyo-gun (JP); Hidetoshi Sakai, Iyo-gun (JP); Yuichiro Sento, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 247 days.

(21) Appl. No.: 18/282,903

(22) PCT Filed: Mar. 16, 2022

(86) PCT No.: PCT/JP2022/011799
§ 371 (c)(1),
(2) Date: Sep. 19, 2023

(87) PCT Pub. No.: WO2022/202515
PCT Pub. Date: Sep. 29, 2022

(65) Prior Publication Data
US 2024/0174822 A1 May 30, 2024

(30) Foreign Application Priority Data
Mar. 23, 2021 (JP) ................................. 2021-048306

(51) Int. Cl.
*C08J 5/04* (2006.01)
*C08J 5/06* (2006.01)
(Continued)

(52) U.S. Cl.
CPC ................. *C08J 5/042* (2013.01); *C08J 5/06* (2013.01); *C08J 5/243* (2021.05); *C08J 9/0085* (2013.01);
(Continued)

(58) Field of Classification Search
CPC ..... C08J 5/042; C08J 5/043; C08J 5/06; C08J 9/0085; C08J 2205/10; C08J 2325/06;
(Continued)

(56) References Cited

U.S. PATENT DOCUMENTS

2017/0226327 A1* 8/2017 Kabeya .................... C08K 7/02
2019/0002654 A1 1/2019 Shinohara et al.
2020/0207897 A1 7/2020 Haraguchi et al.

FOREIGN PATENT DOCUMENTS

JP 2001-354718 A 12/2001
JP 2009-275081 A 11/2009
(Continued)

OTHER PUBLICATIONS

International Search Report, issued in PCT/JP2022/011799, PCT/ISA/210, dated May 31, 2022.
(Continued)

*Primary Examiner* — Camie S Thompson
(74) *Attorney, Agent, or Firm* — Birch, Stewart, Kolasch & Birch, LLP

(57) ABSTRACT

Provided is a porous structure, made from fiber-reinforced resin, which is lightweight and has excellent mechanical properties. The fiber-reinforced resin comprises a reinforcing fiber base material and a thermoplastic resin, wherein the reinforcing fiber base material includes 50-100 weight % reinforcing fibers having a fiber length of 2-10 mm, the total amount of reinforcing fibers being 100 weight %, and the thermoplastic resin has a long chain branched structure.

15 Claims, 2 Drawing Sheets

(51) Int. Cl.
*C08J 5/24* (2006.01)
*C08J 9/00* (2006.01)

(52) U.S. Cl.
CPC ........ *C08J 2205/10* (2013.01); *C08J 2323/12* (2013.01); *C08J 2325/06* (2013.01)

(58) Field of Classification Search
CPC .... C08J 2377/00; B29C 70/04; B29C 70/006; B29C 70/24; B29C 70/12
USPC ............................................... 428/292.1, 394
See application file for complete search history.

(56) References Cited

FOREIGN PATENT DOCUMENTS

| | | | |
|---|---|---|---|
| JP | 2014-205822 | A | 10/2014 |
| JP | 2014-208802 | A | 11/2014 |
| JP | 2019-19295 | A | 2/2019 |
| WO | WO 2017/110532 | A1 | 6/2017 |

OTHER PUBLICATIONS

Written Opinion of the International Searching Authority, issued in PCT/JP2022/011799, PCT/ISA/237, dated May 31, 2022.

* cited by examiner

FIBRE-REINFORCED RESIN, POROUS STRUCTURE, AND MOLDED MEMBER

TECHNICAL HELD

The present invention relates to a fiber reinforced resin including a reinforcing fiber base material and a thermoplastic resin, and also relates to a porous structure material and molded members,

BACKGROUND ART

In recent years, there are increasingly stronger calls for highly lightweight materials for industrial products such as automobiles, aircraft, sports products, and electronic instruments. In order to meet such demands, porous structure materials that are very light in weight and have excellent mechanical properties are now widely used for various industrial applications. However, although being very light in weight, porous structure materials that have voids have the disadvantage of being largely inferior in mechanical properties such as compressibility.

Patent document 1 discloses an invention of a structure material including resin, reinforcing fibers, and voids. Since the reinforcing fibers are discontinuous, substantially in the form of monofilaments, and randomly dispersed, the voids, which are formed by the action of the elastic force of the reinforcing fibers, become dense, and high lightness and excellent mechanical properties are expected to be achieved simultaneously, Patent document 2 discloses an invention of a polypropylene resin extruded foam containing a fibrous filler. The fibrous filler is not only oriented in the extrusion direction but also oriented in the thickness direction due to the presence of foam cells. It is described that this leads to good mechanical properties in the thickness direction. It is also described that the use of a polypropylene resin with excellent viscoelastic characteristics makes it possible to form dense independent foam cells and that this allows largely decreased weight and highly enhanced mechanical properties to be achieved simultaneously.

PRIOR ART DOCUMENTS

Patent Documents

Patent document 1: International Publication WO 2017/110532

Patent document 2: International Publication WO 2006/054715

SUMMARY OF INVENTION

Problems to be Solved by the Invention

In the structure material disclosed in Patent document 1, the resin tends to be broken as it is stretched due to the expansion of the structure material that is caused by the action of the elastic force of reinforcing fibers, Here, the reinforcing fibers are bound to each other only by the resin at the intersections between them and the portions where the resin is ruptured tend to be expanded largely to form uneven void structures. In view of these facts, there is room for significant improvement in mechanical properties.

The extruded foam material disclosed in Patent document 2 has a high proportion of short fibers as a result of breakage of reinforcing fibers and accordingly, they cannot work sufficiently to ensure strong reinforcement. Furthermore, since it is produced by foaming a kneaded fiber reinforced resin using a foaming agent, it is difficult to create a structure in which reinforcing fibers intersect each other at many points to achieve reinforcement and accordingly, the reinforcing fibers cannot work sufficiently to ensure strong reinforcement.

The present invention was made in view of the above problems, and the main object thereof is to provide a porous structure material of a fiber reinforced resin that is lightweight and has excellent mechanical properties.

Means of Solving the Problems

In order to solve the above problems, the present invention relates to a fiber reinforced resin including a reinforcing fiber base material and a thermoplastic resin wherein the reinforcing fibers having fiber lengths of 2 or more and 10 or less mm account for 50 or more and 100 or less wt % of the total weight, which accounts for 100 wt %, of the reinforcing fibers present in the reinforcing fiber base material and also wherein the thermoplastic resin has long chain branched structures.

Advantageous Effects of the Invention

According to the present invention, it is possible to obtain a porous structure material of a fiber reinforced resin that is lightweight and has excellent mechanical properties.

DESCRIPTION OF PREFERRED EMBODIMENTS

Figure 1:
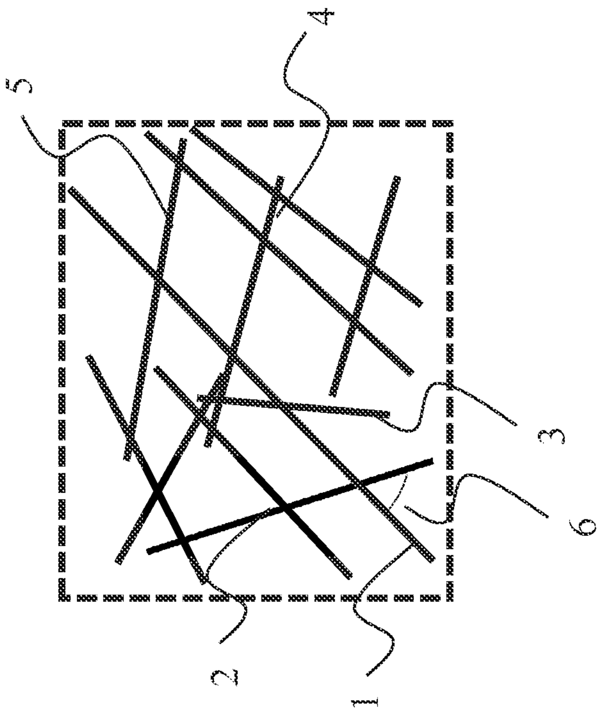
FIG. 1 This is a schematic diagram showing the dispersion state of reinforcing fibers in the reinforcing fiber base material contained in the fiber reinforced resin according to the present invention.

The invention is described in more detail below.

<Fiber Reinforced Resin>

The present invention provides a fiber reinforced resin including a reinforcing fiber base material and a thermoplastic resin. In the reinforcing fiber base material, reinforcing fibers having fiber lengths of 2 or more and 10 or less mm account for 50 or more and 100 or less wt % of the total weight, which accounts for 100 wt %, of the reinforcing fibers present in the reinforcing fiber base material. When the proportion of reinforcing fibers having fiber lengths of 2 mm or more is 50 wt % or more, it allows the reinforcing fibers to work sufficiently for reinforcement and serve to produce a fiber reinforced resin having improved mechanical properties. Furthermore, in the case where it is expanded by the action of the elastic force of the reinforcing fiber base material as described later, the reinforcing fiber base material becomes bulky to increase the expansion force. On the other hand, when the proportion of reinforcing fibers having fiber lengths of more than 10 mm is more than 50 wt %, although the expansion force increases, the proportion of bent fibers in the resulting fiber reinforced resin will increase and accordingly, it will deteriorate in mechanical properties.

The ratio (Lw/Ln) of the weight average fiber length (Lw) to the number average fiber length (Ln) of reinforcing fibers is preferably 1 or more and 1.4 or less, and more preferably 1 or more and 1.3 or less. A small Lw/Ln indicates that the variation in fiber length is small. When the variation in fiber length is small, it becomes easier for the fiber structure described later that contains reinforcing fibers intersecting each other to be formed uniformly. To calculate the distribution of fiber length, the resin component is removed from the fiber reinforced resin by burning, dissolution, etc., and 400 fibers are randomly selected from the remaining reinforcing fibers and examined to determine their lengths to the nearest 0.01 mm, which are then rounded off to the nearest 0.1 mm.

<Reinforcing Fiber Base Material>

It is preferable that the reinforcing fiber base material have portions that include reinforcing fibers intersecting each other and have a three dimensional network structure in which those many reinforcing fibers contain voids among them. If it has such a structure, expansion by the action of the elastic force of the reinforcing fiber base material can be easily caused by melting or softening thermoplastic resin heating. This serves to form a porous structure material as described later. That is, the thermoplastic resin in a molten or softened state is deformed as a result of expansion, and muscle-like structures that bind reinforcing fibers together are formed in the three dimensional network structure that contain those reinforcing fibers. At the same time, the deformation of the thermoplastic resin cannot catch up with the expansion of the reinforcing fiber base material in some portions. These portions are left empty to form voids that contain neither reinforcing fibers nor thermoplastic resin, thereby serving to form a porous structure.

As a specific form, nonwoven fabric is useful as the reinforcing fiber base material, and more specifically, good examples include chopped strand mat, continuous strand mat, paper-like mat, carding mat, and air-laid mat. Furthermore, from the viewpoint of expansion to be caused by the action of the elastic force of reinforcing fibers, it is preferable that reinforcing fibers intersecting each other be bound with resin or the like in the reinforcing fiber base material.

<Reinforcing Fiber>

The orientation state of reinforcing fibers can be expressed based on the two dimensional orientation angle, that is, the angle formed between a certain reinforcing fiber monofilament (a) and another reinforcing fiber monofilament (b) that intersects the reinforcing fiber monofilament (a). The two dimensional orientation angle will be described below with reference to FIG. 1. FIG. 1 gives a schematic view illustrating a dispersion state of reinforcing fibers in which only those reinforcing fibers belonging to the fiber reinforced resin are seen in the plane direction. When looking at the reinforcing fiber monofilament 1, the reinforcing fiber monofilament 1 intersects the reinforcing monofilaments 2 to 5. Here, the term “intersect” means that the reinforcing fiber monofilament (a) selected in the observed two dimensional plane appears to cross another reinforcing fiber monofilament (b). However, in the actual fiber reinforced resin, the reinforcing fiber monofilament 1 is not necessarily in contact with the reinforcing fiber monofilaments 2 to 5. Of the two angles formed between two reinforcing fiber monofilaments, the two dimensional orientation angle is defined as the acute one, that is, the angle 6. There is no particular limitation on the method to use to measure the average two dimensional orientation angle, but for example, it can be determined by observing the orientation of the reinforcing fibers from the surface. This method is preferable because the reinforcing fibers can be observed more clearly if the surface is polished to expose the fibers. In addition, there is another method that is intended to observe the orientation of reinforcing fibers by means of a light beam that penetrates through the resin. This method is preferable because the reinforcing fibers can be observed more clearly by preparing a thin sliced specimen. There is still another method that is intended to perform X-ray CT transmission observation to take photographic images of the oriented reinforcing fibers. In the case of observing reinforcing fibers that are high in radiolucency, this method is preferable because the observation of reinforcing fibers can be made easier by adding tracer fibers to the reinforcing fibers or by applying a tracing agent to the reinforcing fibers.

The average two dimensional orientation angle is determined by carrying out the steps I and II described below.

I. A reinforcing fiber monofilament (a) is selected at random and the acute angle formed to each of all reinforcing fiber monofilaments (b) that intersect the former is measured, followed by calculating the average of the measurements of the two dimensional orientation angle. If the number of reinforcing fiber monofilaments (b) that intersect the reinforcing fiber monofilament (a) is too large, 20 of the reinforcing fiber monofilaments (b) that intersect it may be selected at random and the average of their measurements may be used instead.

II. Other reinforcing fiber monofilaments are selected and the measuring procedure in the step I above is repeated a total of five times, followed by averaging the measurements to determine the average two dimensional orientation angle.

For the present invention, the reinforcing fibers have an average two dimensional orientation angle of 10 or more and 80 or less degrees, preferably 20 or more and 70 or less degrees, more preferably 30 or more and 60 or less degrees, and still more preferably as close to the ideal angle of 45 degrees as possible. If the average two dimensional orientation angle is less than 10 degrees or more than 80 degrees, it means that many of the reinforcing fibers are in the form of bundles. When the reinforcing fibers have an average two dimensional orientation angle of 10 or more and 80 or less degrees, the fiber reinforced resin has a higher moldability into a complicated shape. Furthermore, if they are not oriented in a specific direction, they serve to produce a fiber reinforced resin that shows isotropic mechanical properties. In addition, in the case where it is to be expanded by the action of the elastic force of the reinforcing fiber base material as described later, the reinforcing fiber base material will become bulky to develop a sufficient expansion force. Furthermore, in the resulting porous structure material, the meshes in the three dimensional network structure formed of reinforcing fibers will be densified to ensure a large reinforcing effect.

There are no specific limitations on the type of reinforcing fiber to use, and useful ones include, for example, carbon fiber, glass fiber, aramid fiber, alumina fiber, silicon carbide fiber, boron fiber, metal fiber, natural fiber, and mineral fiber, which may be used singly or as a mixture of two or more thereof. In particular, in order to ensure increased specific strength, increased specific rigidity, and weight reduction, the use of carbon fiber such as polyacrylonitrile (PAN) based one, pitch based one, and rayon based one is preferable. In addition, in order to provide a fiber reinforced resin with enhanced economical features, the use of glass fiber is preferable, and the combined use of carbon fiber and glass fiber is particularly preferable from the viewpoint of the balance between mechanical properties and economical features. Furthermore, in order to provide a fiber reinforced resin with enhanced impact absorbability and shapeability, the use of aramid fiber is preferable, and the combined use of carbon fiber and aramid fiber is preferable from the viewpoint of the balance between mechanical properties and impact absorbability. In addition, in order to provide a fiber reinforced resin with enhanced electric conductivity, the use of a reinforcing resin fiber coated with metal such as nickel, copper, and ytterbium or the use of pitch based carbon fiber is preferable.

The reinforcing fiber to use preferably has a tensile strength of 3,000 MPa or more, more preferably 4,000 MPa or more. If the reinforcing fiber has a tensile strength in the range specified above, it serves to prevent the reinforcing fiber from being broken during the process. Furthermore, from the viewpoint of the mechanical properties of the resulting fiber reinforced resin, it is preferable for the reinforcing fiber to have a tensile modulus of elasticity of 100 GPa or more, more preferably 200 GPa or more. There are no specific limitations on the upper limits on the tensile strength and tensile modulus of elasticity of the reinforcing fiber. To ensure both of these, it is preferable to use a PAN based carbon fiber as the reinforcing fiber.

The thermoplastic resin contained in the fiber reinforced resin according to the present invention is a thermoplastic resin having long chain branched structures. Resins having long chain branched structures include, for example, polypropylene resins and low density polyethylene in which long chain branched structures has been introduced using a metallocene catalyst, and polystyrene resins, polycarbonate resins, polyphenylene sulfide resins, etc. in which long chain branched structures has been introduced using a branching agent. The use of polyolefin or polystyrene is preferable from the viewpoint of weight reduction, whereas the use of a polyphenylene sulfide resin is preferable from the viewpoint of heat resistance. Furthermore, in order to allow the structure formed during expansion to be retained, the use of a crystalline resin is preferable because the resin is required to cool and solidify quickly from the molten state, whereas the use of an amorphous resin is preferable from the viewpoint of the process window.

Commercial products of resins having long chain branched structures include, for example, those of polypropylene resin such as MFX6 EX6000 (Japan Polypropylene Corporation), which is a polypropylene resin having long chain branched structures, those of polystyrene resin such as HMT1 (Toyo Styrene Co., Ltd.), which is a polystyrene resin having long chain branched structures, those of polycarbonate resin such as FN1700A (Idemitsu Petrochemical Co., Ltd.), which is a polycarbonate resin having long chain branched structures, and those of polyphenylene sulfide resin such as LF3G (DIC EP Co., Ltd.), which is a polyphenylene sulfide resin having long chain branched structures.

If a thermoplastic resin having long chain branched structures is used, the entanglement of molecular chains having long chain branched structures will cause the thermoplastic resin to behave as an elastic material and allows it to be stretched without being broken. When it is expanded by the action of the elastic force of the reinforcing fiber base material to form a porous structure as described later, these characteristics serve to allow the resin to be stretched easily without being broken so that continuous muscle-like structures can be formed without breakage of the resin in the porous structure material. The ratio G'(0,01)/G'(0.001) of the melt storage modulus G'(0.01) at a frequency of 0.01 Hz to the storage modulus G'(0.001) at a frequency of 0.001 Hz measured at a temperature higher by 30° C. than the melting point in the case of a crystalline resin or at a temperature higher by 80° C. than Tg (here, Tg being the glass transition, and the same applying hereafter) in the case of an amorphous resin can be used as an index to represent the elasticity of a thermoplastic resin. For the present Description, in the case where a plurality of melting points or Tg's are observed, the measuring temperature is set based on the highest of the melting points or Tg's. It is preferable for the present invention to use a thermoplastic resin having a G'(0.01)/G'(0.001) ratio of 15 or less, more preferably 12 or less, still more preferably 10 or less, and particularly preferably 7 or less. The melt storage modulus is measured according to ISO6721-10(1999). If G'(0.01)/G'(0.001) is 15 or less, as the fiber reinforced resin is expanded by the action of the elastic force of the reinforcing fiber base material as described later, the small G'(0.01)/G'(0.001) ratio allows the resin to be stretched without breakage when it is stretched by the action of the elastic force of the reinforcing fiber base material being applied to the thermoplastic resin.

For a polypropylene resin, the inclusion of long chain branched structures can be confirmed by the method described below. A polypropylene containing long chain branched structures has a branched structure as shown by the structural formula of Chemical compound 1.

[Chemical compound 1]

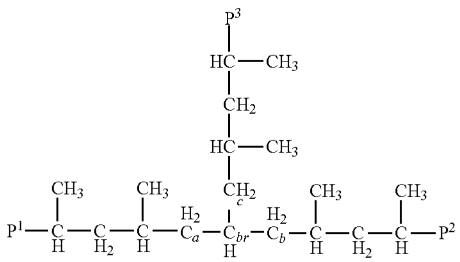

In the structural formula, Ca, Cb, and Cc are methylene carbons adjacent to a branched carbon atom and $P^1$, $P^2$, and $P^3$ are polypropylene residues. Here, $P^1$, $P^2$, and $P^3$ themselves are likely to contain a branched carbon atom (Cbr) other than the one denoted by Cbr in the structural formula. Such a branched structure can be identified by $^{13}$C-NMR analysis. The assignment of each peak can be determined based on the description on pp. 3,839-3,842 of Macromolecules, Vol. 35, No. 10, 2002. Specifically, a total of three methylene carbons (Ca, Cb, Cc) are observed at 43.9 to 44.1 ppm, 44.5 to 44.7 ppm, and 44.7 to 44.9 ppm while a methine carbon (Cbr) is observed at 31.5 to 31.7 ppm. The methine carbon observed at 31.5 to 31.7 ppm will be occasionally referred to as branched carbon atom (Cbr). It has the feature that the three methylene carbon atoms located adjacent to a branched methine carbon Cbr give three separate peaks observed diastereotopically and nonequivalently. The long chain branched structure referred to for the present invention shows a polypropylene residue having 5 or more carbon atoms branched from the backbone chain of the polypropylene. It can be distinguished from a branch having 4 or less carbon atoms based on the difference between the peak positions of their branched carbon atoms (see Macromol. Chem. Phys., 2003, Vol. 204, p. 1738).

It can also be confirmed by using the branching index that is calculated based on the relation between molecular weight and viscosity. The branching index g' is known to be directly related with long chain branching. The branching index g' is represented by the formula given below.

$$\text{branching index } g' = \frac{[\eta]_{br}}{[\eta]_{lin}} \quad \text{[Mathematical formula 1]}$$

$[\eta]_{br}$: intrinsic viscosity of polymer containing long chain branched structures $[\eta]_{lin}$: intrinsic viscosity of linear polymer molecule having the same molecular weight as the polymer containing long chain branched structures If the branching index g' has a value smaller than 1, it suggests that there exist long chain branched structures, and the value of the branching index g' decreases with an increasing number of long chain branched structures. The branching index g' can be determined using a GPC apparatus equipped with a light scattermeter and a viscometer as detectors, and the branching index (g') is calculated from a measured intrinsic viscosity ([η]br) of a sample of the relevant substance and the intrinsic viscosity ([η]lin) of a linear polymer measured elsewhere. If long chain branched structures are introduced into a polymer molecule, its radius of inertia decreases as compared with a linear polymer molecule having the same molecular weight. The intrinsic viscosity decreases with a decreasing radius of inertia and accordingly, if long chain branched structures are introduced, they work to decrease the branching index g', which is the ratio of the intrinsic viscosity ([η]br) of a branched polymer to the intrinsic viscosity ([η]) of a linear polymer having the same molecular weight. The fact that the logarithm of [η]lin of a linear polymer and the logarithm of its molecular weight has a linear relationship has been generally known as indicated by the Mark-Houwink-Sakurada equation and therefore, the value of [η]lin can be determined by taking measurements from the linear polymer and extrapolating them appropriately to the low molecular weight side or the high molecular weight side.

In general, the branching index g' of a polymer is in the range of 0 or more and 1 or less. Polymers having only linear structures has a branching index g' of 1, and the branching index g' approaches 0 as the number of long chain branched structures increases. For the present invention, in the case of resins other than polypropylene resins, those having a branching index of 0.95 or less are considered to have long chain branched structures. The branching index g' is preferably 0.5 or more and 0.95 or less, and more preferably 0.8 or more and 0.95 or less. When the branching index is 0.95 or less, the resin in a porous structure material tends to form continuous muscle-like structures easily without breakage. On the other hand, if the branching index is too large, it works to prevent the expansion of the fiber reinforced resin base material and therefore, it is preferable for the branching index to be 0.5 or more.

If the melt viscosity of the thermoplastic resin in the low frequency region is high, this is preferable because aggregation of the resin can be suppressed and also because the resin can maintain continuous muscle-like structures unbroken when expansion is caused by the action of the elastic force of the reinforcing fiber base material to form a porous structure material as described later. The melt complex viscosity η(0.001) that is measured at a frequency of 0.001 Hz and at a temperature higher by 30° C. than the melting point in the case of a crystalline resin or at a temperature higher by 80° C. than Tg in the case of an amorphous resin can be used as an index. In the case where a plurality of melting points is observed, the measuring temperature is set based on the highest of the melting points. For the present invention, the complex viscosity η(0.001) is preferably 3,500 [Pa·s] or more and η(0.001) is more preferably 6,000 [Pa·s] or more. The complex viscosity n is measured according to 1S06721-10(1999). If the complex viscosity η(0.001) is controlled in the above range, it serves to prevent the resin from moving and its agglomeration can be avoided. In addition, the thermoplastic resin preferably has a melt flow rate of 1.0 or more and 40 or less g/10 min, more preferably 2.0 or more and 35 or less g/10 min. The melt flow rate is measured according to JIS K7210:2014 at a temperature specified separately for each resin. For resins for which temperatures are not specified in JIS, measurement is performed at a temperature higher by 50° C. than the melting point in the case of a crystalline resin or at a temperature higher by 100° C. than Tg in the case of an amorphous resin, and at a load of 2.16 kg. If the thermoplastic resin has a melt flow rate of 1 g/10 min or more, it allows the reinforcing fiber base material to be impregnated easily with a thermoplastic resin during the production process for fiber reinforced resin base materials described later. On the other hand, if the thermoplastic resin has a melt flow rate of 40 g/10 min or less, it serves to prevent the thermoplastic resin from flowing out from side faces of the reinforcing fiber base material during the impregnation of the reinforcing fiber base material with the thermoplastic resin, making it easy to produce a fiber reinforced resin having an intended shape. A thermoplastic resin having long chain branched structures has a higher viscosity in a low frequency range than in a high frequency range. Therefore, it is possible to increase the viscosity in a low frequency range while maintaining the melt flow rate within a preferable range.

Figure 2:
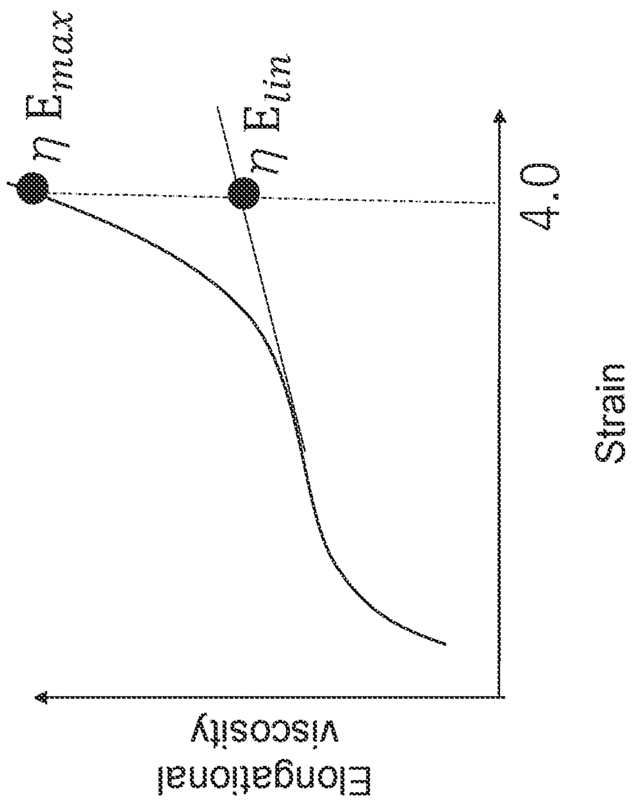
FIG. 2 This is a schematic diagram showing a graph of the elongational viscosity measured by a uniaxial elongational viscometer plotted against the strain.

In addition, it is preferable for the thermoplastic resin to have strain-hardening feature. A resin which have strain-hardening feature is defined as one that increases in viscosity when the resin in a molten state is deformed to a certain degree or more. In the case where a resin which have strain-hardening feature is adopted, as the resin is deformed along with the deformation of the fiber reinforced resin, the viscosity of the resin in the deformed portions will increase specifically to cause a difference in resin viscosity between the deformed portions and the undeformed portions. Accordingly, this promotes the deformation of the undeformed portions where the viscosity is low to allow the resin to be deformed uniformly and therefore, the resin can be stretched without breakage. In addition, the resin in the stretched portions will specifically increase in viscosity to realize uniform expansion and achieve the formation of a dense void structure. For the present Description, a resin which have strain-hardening feature means one having a strain-hardening rate of 1.1 or more as determined from uniaxial extensional viscosity measurement that is performed at a temperature higher by 30° C. than the melting point of the thermoplastic resin in the case where it is a crystalline resin or at a temperature higher by 80° C. than Tg in the case where it is an amorphous resin. In the uniaxial extensional viscosity measurement, the extensional viscosity is first measured at a strain rate of 11 sec and plotted on a double logarithmic graph with the strain [-] on the horizontal axis and the extensional viscosity ηE (Pa·s) on the vertical axis as illustrated in FIG. 2. Here, the strain is the Hencky strain, which is calculated by the formula given below.

[Mathematical formula 2]

$$\text{Hencky strain } [-] = \ln\frac{\text{length of stretched specimen}}{\text{length of unstretched specimen}}$$

On the double logarithmic graph, the viscosity immediately before the start of strain-hardening is approximated by a straight line and the extensional viscosity ηE (ηEmax) at a point where the strain calculated by the formula 2 (the formula given above) is 4.0 is determined. Then, the extensional viscosity gradient immediately before the start of strain-hardening is approximated by a straight line, and the approximate extensional viscosity ηElin at a strain of 4.0 is determined. Here, the strain-hardening rate is defined as ηEmax/ηElin. In the case where the resin is ruptured before it is stretched to a strain of 4.0, the measurement at the rupture point is adopted as ηE (ηEmax). On the other hand, if strain-hardening does not occur, the strain-hardening rate is defined as 1. In the case where a plurality of melting points is observed, the measuring temperature is set based on the highest of the melting points. It is preferable for the thermoplastic resin to have a strain-hardening rate of 2 or more, more preferably 4 or more, and still more preferably 6 or more. On the other hand, if the strain-hardening rate is too large, it works to prevent the expansion of the fiber reinforced resin base material and therefore, it is preferable for the strain-hardening rate to be 20 or less.

In addition, depending on the intended uses, the thermoplastic resin may contain fillers such as mica, talc, kaolin, hydrotalcite, sericite, bentonite, xonotlite, sepiolite, smectite, montmorillonite, wollastonite, silica, calcium carbonate, glass beads, glass flake, glass microballoon, clay, molybdenum disulfide, titanium oxide, zinc oxide, antimony oxide, polycalcium phosphate, graphite, barium sulfate, magnesium sulfate, zinc borate, calcium borohydride, aluminum borate whisker, potassium titanate whisker, and polymer compounds; electric conductivity imparting agents such as metal based ones, metal oxide based ones, carbon black, and graphite powder; halogen based flame retardants such as brominated resin; antimony based flame retardants such as antimony trioxide and antimony pentoxide; phosphorous flame retardants such as ammonium polyphosphate, aromatic phosphates, and red phosphorus; organic acid metal salt based flame retardants such as metal borates, metal carboxylates, and aromatic sulfoimide metal salts; inorganic flame retardants such as zinc borate, zinc, zinc oxide, and zirconium compounds; nitrogen based flame retardants such as cyanuric acid, isocyanuric acid, melamine, melamine cyanurate, melamine phosphate, and nitrogenized guanidine; fluorine based flame retardants such as PTFE; silicone based flame retardants such as polyorganosiloxane; metal hydroxide based flame retardants such as aluminum hydroxide and magnesium hydroxide; other flame retardants; flame retardation assistants such as cadmium oxide, zinc oxide, cuprous oxide, cupric oxide, ferrous oxide, ferric oxide, cobalt oxide, manganese oxide, molybdenum oxide; tin oxide, and titanium oxide; pigments; dyes; lubricant, mold releasing agent; compatibilizer; dispersing agent; crystal nucleating agents such as mica, talc, and kaolin; plasticizers such as phosphates; thermal stabilizer; antioxidant; color protection agent; ultraviolet absorber; flowability modifying agent; foaming agent; antibacterial agent; vibration damping agent; deodorant; slidability modifying agent; and antistatic agents such as polyether ester amide. In particular, when applied to such products as electric/electronic instruments, automobiles, and aircraft, flame retardance is required in some cases, and it may be preferable to add a phosphorous flame retardant, nitrogen based flame retardant, or inorganic flame retardant. When adding such a flame retardant, it is preferable for the flame retardant to account for 1 or more and 20 or less parts by weight relative to 100 parts by weight of the thermoplastic resin in order to ensure a good balance among properties including the mechanical properties of the thermoplastic resin to use and the resin flowability during the molding process as well as the development of fire retardance. It more preferably accounts for 1 or more and 15 or less parts by weight.

In the resulting fiber reinforced resin; it is preferable for the reinforcing fiber to account for 3 or more and 60 or less vol %, more preferably 10 or more and 40 or less vol %, and particularly preferably 15 or more and 30 or less vol %, relative to the total volume of the reinforcing fiber and the thermoplastic resin. If the volume content of the reinforcing fiber is 3 vol % or more, it allows the reinforcing fiber to have a sufficient reinforcing effect. Furthermore, when forming a porous structure material using the fiber reinforced resin according to the present invention, a thermoplastic resin content of 40 vol % or more serves to allow the thermoplastic resin to easily form muscle-like structures as described later and also serves to form a porous structure material having required mechanical properties. The volume contents of the resin and the reinforcing fiber can be determined by, for example, putting a specimen of the porous structure material in a crucible, heating it at a high temperature until the resin component is eliminated, and measuring the weight of the remaining reinforcing fiber.

There are no specific limitations on the shape of the fiber reinforced resin according to the present invention, but it is preferably in the form of a sheet from the viewpoint of its use for laminate production.

An embodiment of the fiber reinforced resin according to the present invention is in the form of a porous structure material as described later, but in the case of another embodiment that does not have a porous structure, the resin is used as its precursor. In this case, the fiber reinforced resin preferably has a void fraction of 20% or less, more preferably 15% or less, and still more preferably 10% or less, and the void fraction is most preferably 5% or less. If the void fraction is controlled in this range, it serves to reduce the unimpregnated portions that are free of resin impregnation and prevent defective portions where fibers are not fixed sufficiently by the resin from being formed as a result of an insufficient amount of the resin left in the resulting porous structure material. Here, the void fraction is a value calculated by the formula given below from the true specific gravity and the bulk specific gravity of the fiber reinforced resin.

[Mathematical formula 3]

$$\text{void fraction [\%]} = \left( \frac{\text{true specific gravity of fiber reinforced resin} - \text{bulk specific gravity of fibre reinforced resin } (\rho)}{\text{true specific gravity fiber reinforced resin}} \times 100 \right)$$

To determine the true specific gravity, a sample is prepared by crushing a fiber reinforced resin into a void-free powder with a particle diameter of 150 μm or less and subjected to measurement by the pycnometer method specified in ISO1183(1987), whereas the bulk specific gravity is determined by cutting out a sample from a fiber reinforced resin and subjected to measurement according to ISO845 (1988).

Furthermore, in the case of a precursor, it is preferable that the reinforcing fiber base material be in a compressed state, which means that at least part of the reinforcing fibers in the reinforcing fiber base material are in a bent form, because the aforementioned elastic force will be larger in that case.

The embodiment of the fiber reinforced resin according to the present invention that does not have a porous structure as described later can serve suitably as a precursor for the embodiment of the fiber reinforced resin that has a porous structure. In this case, it is desirable for the fiber reinforced resin to be expandable. For the present Description, a fiber reinforced resin that is expandable is defined as one that shows an expansion ratio of 1.5 or more as calculated by the formula given below when the thermoplastic resin is melted at or above a temperature higher by 20° C. than the melting point in the case where it is a crystalline resin or at a temperature higher by 100° C. than Tg in the case where it is an amorphous resin.

[Mathematical formula 4]

$$\text{expansion ratio} = \frac{\text{true specific gravity of expanded fiber reinforced resin}}{\text{bulk specific gravity of expanded fiber reinforced resin } (\rho)}$$

To determine the true specific gravity, a sample is prepared by crushing the expanded fiber reinforced resin into a void-free powder with a particle diameter of 150 μm or less and subjected to measurement using the pycnometer method specified in ISO1183(1987), whereas the bulk specific gravity of the expanded fiber reinforced resin is determined by cutting out a sample from the fiber reinforced resin and subjecting it to measurement according to ISO845(1988).

Here, the embodiment of the fiber reinforced resin according to the present invention that does not have a porous structure is not limited to this use. Since it can be stretched without breakage of the resin, it is so high in processability that it can be applied effectively to molding processes such as, for example, deep-draw molding, blow molding, foam molding, and stretching molding that involve the elongation of the resin.

<Porous Structure Material>

As described above, the fiber reinforced resin according to the present invention may have a porous structure. A fiber reinforced resin according to this embodiment is referred to as a porous structure material hereinafter in the present Description. In the porous structure material, reinforcing fibers present in the reinforcing fiber base material intersect each other to form a three dimensional network structure, and the thermoplastic resin forms muscle-like structures that bind reinforcing fibers together in meshes of the three dimensional network structure. It also contains portions each surrounded by reinforcing fibers and/or thermoplastic resin and internally free of these reinforcing fibers and thermoplastic resin, and these portions are referred to as voids in the present Description.

Figure 4:
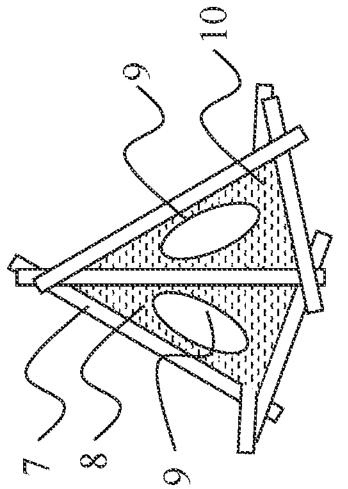
FIG. 4 This is an enlarged schematic diagram showing the structure formed of reinforcing fibers and thermoplastic resin in the porous structure material according to the present invention.
Figure 3:
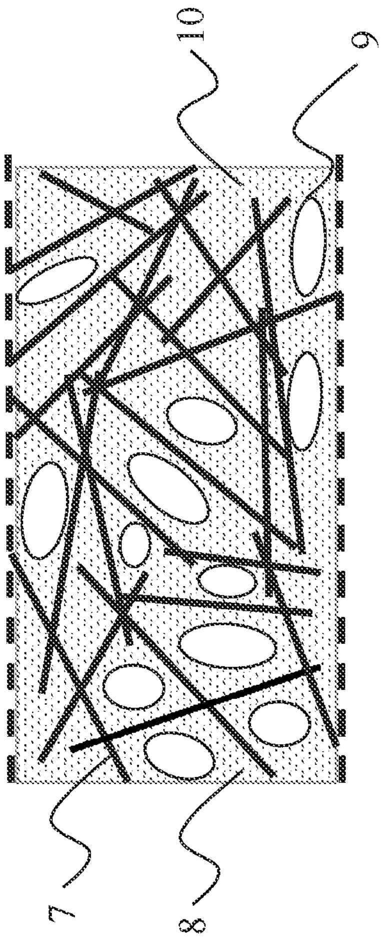
FIG. 3 This is a schematic diagram showing the cross-sectional structure of the porous structure material according to the present invention.

FIG. 3 is a diagram showing a typical cross section of the porous structure material according to the present invention. As seen in FIG. 3, in the porous structure material, the reinforcing fibers 7 form a network structure. Here, FIG. 3 is a cross-sectional diagram and gives a two dimensional view, but actually, reinforcing fibers 7 form a three dimensional network structure. In addition, the thermoplastic resin 8 exits to work as the matrix for the three dimensional network structure. FIG. 4 is a schematic diagram showing three-dimensionally a part of the three dimensional network structure formed of reinforcing fibers. As seen in FIG. 4, the thermoplastic resin 8 forms muscle-like structures 10 that bind reinforcing fibers together in meshes of the three dimensional network structure formed of reinforcing fibers. In addition, voids 9 are formed as portions free of the thermoplastic resin 8 in meshes of the three dimensional network structure. The porous structure material is strengthened by these muscle-like structures of the thermoplastic resin to develop better mechanical properties.

In the fiber reinforced resin, it is preferable for the muscle-like structures of the thermoplastic resin to extend continuously over 300 μm or more. The expression "muscle-like structures extend continuously over 300 μm or more" means that structures in which the resin extends continuously over 300 μm or more both in the plane direction and in the thickness direction are dominant. Here, whether the resin extends continuously or not can be determined by examining its cross section by X-ray CT transmission observation.

The void area rate A determined from a cross-sectional photograph is preferably 35% or less, and more preferably 25% or less. In addition, the ratio NB of the void area rate A to the expansion ratio B that will be described later is preferably 8 or less, more preferably 7 or less, and still more preferably 6 or less. As described above, as the proportion of void portions decreases to allow the thermoplastic resin to exist more widely, it works more efficiently in strengthening the three dimensional network structure formed of reinforcing fibers. Furthermore, as the expansion ratio decreases, the thermoplastic resin is less stretched and the thermoplastic resin is less likely to be broken, leading to a smaller void area. On the other hand, a higher expansion ratio is preferable from the viewpoint of weight reduction, and the thermoplastic resin can work more effectively in strengthening the porous structure material. Accordingly, it is preferable for the void area to be small relative to the expansion ratio.

It is preferable for the voids to be small because stress concentration will be caused if they are too large. Thus, the average void area in a cross section of a porous structure material is preferably 6,000 $\mu m^2$ or less, more preferably 5,000 $\mu m^2$ or less, and still more preferably 4,000 $\mu m^2$ or less. It is also preferable for the variation in the void size to be small, and more specifically, the coefficient of variation in the void area is preferably 100% or less, more preferably 90% or less, and still more preferably 80% or less. It should be noted that for the present Description, the average area and the variation coefficient of voids are calculated based on measurements taken from 300 voids randomly selected in the porous structure material.

Here, to perform cross-sectional observation of the porous structure material according to the present invention, first it is cut in one motion of inserting an incisive blade in the perpendicular direction so that the cross section will not be damaged and that a thickness-directional cross section is exposed in such a manner that the cross section has a constant thickness in the thickness direction. Then, it is observed by scanning electron microscopy (SEM) at an accelerating voltage of 0.9 kV, and an evaluation is made based on analysis of the resulting cross-sectional photographs.

Figure 5:
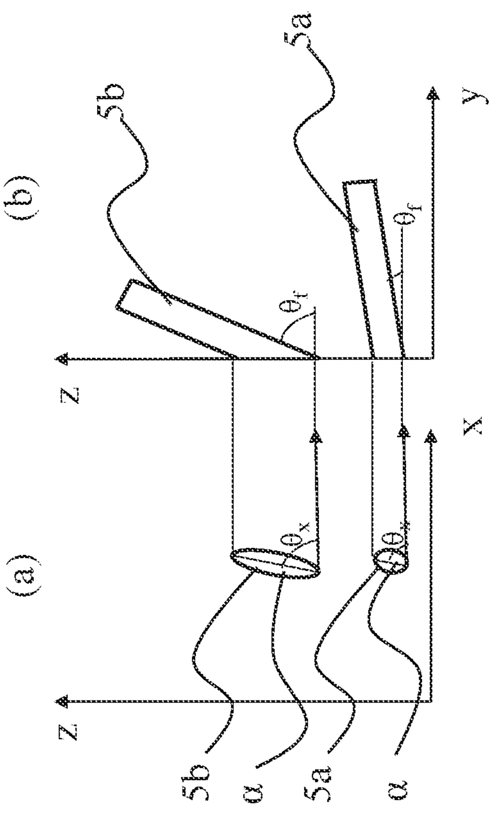
FIG. 5 This gives schematic diagrams showing typical cross-sectional structures observed in the in-plane direction (FIG. 5(*a*)) and in the thickness direction (FIG. 5(*b*)) of the porous structure material according to the present invention.

For the porous structure material according to the present invention, it is preferable that the reinforcing fibers have a thickness-directional orientation angle $\theta_f$ in the range of 0.5 or more and 15 or less degrees, more preferably in the range of 1 or more and 10 or less degrees. When $\theta_f$ is 15 degrees or less, the thermoplastic resin can form muscle-like structures easily without being broken. As compared with this, if $\theta_f$ is less than 0.5 degree, the reinforcing fibers in the porous structure material will be oriented in a plane, that is, oriented two-dimensionally, and tend to fail to achieve significant weight reduction. The value of θf can be determined based on observation of an in-plane directional cross section of the porous structure material. FIG. 5 gives schematic diagrams showing typical cross sections of the porous structure material according to the present invention observed in the in-plane direction (FIG. 5(*a*)) and in the thickness direction (FIG. 5(*b*)). In FIG. 5(*a*), cross sections of the reinforcing fibers 5*a* and 5*b* are approximated by ellipses for simplification of measurement. Here, the cross section of the reinforcing fiber 5*a* appears to have a smaller ellipse aspect ratio (=ellipse major axis/ellipse minor axis), whereas the cross section of the reinforcing fiber 5*b* appears to have a larger ellipse aspect ratio. As compared with this, in FIG. 5(*b*), the reinforcing fiber 5*a* is little inclined and is nearly parallel to the thickness direction Y, whereas the reinforcing fiber 5*b* is largely inclined from the thickness direction Y. In this case, for the reinforcing fiber 5*b*, the angle θx formed between the plane direction X of the structure material and the primary axis α of the fiber (direction of the major axis of its ellipse) is nearly equal to the orientation angle θf of the reinforcing fiber 5*b*. On the other hand, for the reinforcing fiber 5*a*, the angle θx and the orientation angle θf are largely different, and it cannot be said that the angle θx reflects the orientation angle θf. Therefore, when the orientation angle θf is read from the cross section perpendicular to the plane direction of the structure material, the accuracy of detection of the orientation angle θf can be increased by extracting fibers in which the ellipse aspect ratio of their cross section is larger than a certain value. To identify an ellipse aspect ratio to be used as an index for such extraction, when the relevant monofilaments have nearly perfect circular cross sections, that is, when the cross section of each reinforcing fiber perpendicular to the fiber direction has a fiber aspect ratio of 1.1 or less, reinforcing fibers having ellipse aspect ratios of 20 or more are selected and the angle between the plane direction X and the fiber primary axis α is measured and adopted as the orientation angle θf. On the other hand, when the reinforcing fibers have cross sections of elliptical shape, cocoon-like shape, etc., with fiber aspect ratios of larger than 1.1, it is better to focus on reinforcing fibers with larger ellipse aspect ratios and measure their orientation angles θf. When the fiber aspect ratio is 1.1 or more and less than 1.8, reinforcing fibers with an ellipse aspect ratio of 30 or more are selected; when the fiber aspect ratio is 1.8 or more and less than 2.5, those with an ellipse aspect ratio of 40 or more are selected; and when the fiber aspect ratio is 2.5 or more, those with an ellipse aspect ratio of 50 or more are selected. Then the orientation angle θf is measured.

From the viewpoint of weight reduction, it is preferable for the porous structure material to have a bulk specific gravity (ρ) of 0.01 or more and 1.3 or less, more preferably 0.1 or more and 0.6 or less, and still more preferably 0.15 or more and 0.4 or less. To determine the bulk specific gravity, a specimen is cut out of the porous structure material and measurement is performed according to ISO845(1988).

From the viewpoint of the balance between weight reduction and mechanical properties, the expansion ratio B is preferably 1.5 or more and 6 or less, more preferably 1.8 or more and 5 or less, and still more preferably 2.0 or more and 4.5 or less. If the expansion ratio B is small, the expansion will fail to achieve a significant weight reduction, whereas if the expansion ratio is too large, the resulting structure material will fail to have sufficient mechanical properties. Furthermore, if the expansion ratio is increased to higher than the above range, the resin will be broken during expansion and the formation of muscle-dike structures will be difficult. Here, the expansion ratio is the ratio between the true specific gravity and the bulk specific gravity and it is calculated by the formula given above.

When applying a porous structure material to the production of structural members, it is preferable for the porous structure material to have a compression modulus of 10 MPa or more, more preferably 30 MPa or more. There are no specific limitations on the upper limit on the compression modulus of the porous structure material. For the measurement of compression modulus, the porous structure material is cut to prepare a sample of the porous structure material having a size of 20 mm length×20 mm width×4 mm thickness and measurement is performed according to ISO844 (2004).

Similarly, it is preferable for the porous structure material to have a flexural modulus (Ec) of 2.0 GPa or more, more preferably 2.5 GPa or more. To determine the flexural modulus, a sample is cut out of the porous structure material and measurement is performed according to ISO178(1993).

Furthermore, when applying the porous structure material to the production of structural members, it is preferable for its flexural strength to be 15 MPa or more, more preferably 25 MPa or more, and still more preferably 30 MPa or more. To determine the flexural strength, a sample is cut out of the porous structure material and measurement is performed according to ISO178(1993).

It is preferable for the porous structure material to have a maximum thickness of 0.3 mm or more and 10 mm or less, more preferably 0.5 mm or more and 6 mm or less. A large weight reduction can be achieved if the porous structure material has a small thickness, but the porous structure material can fail to have a sufficient rigidity if its thickness is less than 0.3 mm.

<Molded Members>

Another aspect of the present invention relates to molded members that at least partly contain the fiber reinforced resin according to the present invention. An example of the molded members is one having a sandwich structure including, as core layer, a layer of the fiber reinforced resin according to the present invention and, as skin layer, a layer of a continuous fiber reinforced resin produced by impregnating continuous reinforcing fibers with resin. In this case, examples of the continuous reinforcing fibers in the skin layer include cloth formed of reinforcing fiber bundles of many continuous reinforcing fibers, a reinforcing fiber bundle formed of many continuous reinforcing fibers aligned in one direction (unidirectional fiber bundle), and unidirectional cloth formed of unidirectional fiber bundles.

Examples of such molded members include electric and electronic device components such as PCs, displays, OA devices, mobile phones, portable digital assistants; PDAs (personal digital assistants such as electronic notebooks), video cameras, optical devices, audio devices, air conditioners, lighting devices, amusement articles, toy articles, and other home appliances, as well as housing, trays, chassis, interior members, and cases thereof; structural components of automobiles and motorcycles such as various members, various frames, various hinges, various arms, various axles, bearings for various wheels, and various beams, exterior panels and body components including hoods, roofs, doors, fenders, trunk lids, side panels, rear end panels, front bodies, underbodies, various pillars, various members, various frames, various beams, various supports, various rails, and various hinges, exterior components including bumpers, bumper beams, molds, undercovers, engine covers, rectifiers, spoilers, cowl louvers, and aero parts, interior components including instrument panels, seat frames, door trims, pillar trims, steering wheels; and various modules, and others including motor parts, CNG tanks, and gasoline tanks; automobile and motorcycle parts such as battery trays, headlamp supports, pedal housing, protectors, lamp reflectors, lamp housing, noise shields, and spare tire covers; building materials such as sound insulation walls, soundproof walls, and other wall inner members; and aircraft components such as landing gear pods, winglets, spoilers, edges, rudders, elevators, fairings, ribs, and seats. From the viewpoint of mechanical properties, they can be suitably used for interior and exterior components of automobiles, electrical and electronic equipment housing, bicycles, structural members of sports goods, interior components of aircraft, boxes for transportation, and building materials.

<Production Method for Fiber Reinforced Resin>

The fiber reinforced resin according to the present invention that does not have a porous structure can be produced by impregnating a reinforcing fiber base material using a film or nonwoven fabric of a thermoplastic resin as described above while applying pressure. To develop a sufficient elastic force for its expansion, it is preferable that the impregnation with a thermoplastic resin be performed while compressing the reinforcing fiber base material.

A reinforcing fiber base material is prepared by, for example, dispersing beforehand discontinuous reinforcing fibers in a strand-like, preferably nearly monofilament-like, or more preferably monofilament-like form, More specifically, a reinforcing fiber mat can be produced by a dry process such as the air-laid technique in which reinforcing fibers are dispersed in an air stream to form a sheet and the carding technique in which reinforcing fibers are mechanically combed to form a sheet or a wet process such as the Radrite technique in which reinforcing fibers are stirred in water to form a paper-like sheet. To convert discontinuous reinforcing fibers into a form as close to monofilament as possible, good means include the use of a dry process provided with a fiber-opening bar, a device to vibrate the fiber-opening bar, a device to perform fine carding, or a controller for card rotating speed, and the use of a wet process provided with a controller for discontinuous reinforcing fiber stirring conditions, a device to reduce the reinforcing fiber concentration in the dispersion liquid, a controller for the viscosity of the dispersion liquid, or a device to reduce eddy currents during conveyance of the dispersion liquid. Any reinforcing fiber base material to use for the present invention is preferably prepared by a wet process that is designed to perform easy control of the proportion of reinforcing fibers. In a wet process, if, for example, the speed of the mesh conveyor is decreased relative to the flow rate of the reinforcing fiber dispersion liquid, the fibers in the resulting reinforcing fiber base material will be prevented from being oriented in the traveling direction of the conveyor, making it possible to produce a bulky reinforcing fiber base material.

The pressure used to impregnate a reinforcing fiber base material using a film or nonwoven fabric of thermoplastic resin is preferably 0.5 MPa or more and 30 MPa or less, more preferably 1 MPa or more and 10 MPa or less, and still more preferably 2 MPa or more and 8 MPa or less. When the pressure is 0.5 MPa or more, the reinforcing fiber base material will be impregnated sufficiently with the thermoplastic resin, whereas when it is 30 MPa or less, it will be easy to perform thickness control. It is preferable for the impregnation using a film or nonwoven fabric of thermoplastic resin to be performed at or above the melting point in the case where the thermoplastic resin is a crystalline resin or at or above Tg in the case where it is an amorphous resin, more preferably at or above a temperature higher by 10° C. than the melting point or at or above a temperature higher by 80° C. than Tg, and still more preferably at or above a temperature higher by 20° C. than the melting point or at or above a temperature higher by 100° C. than Tg, Here, if the impregnation using a film or nonwoven fabric of thermoplastic resin is performed at an excessively high temperature above the melting point of the thermoplastic resin, the thermoplastic resin is likely to suffer decomposition or degradation and therefore, it is preferably performed at or below a temperature higher by 150° C. than the melting point or Tg.

Useful facilities for carrying out the above methods to impregnate a reinforcing fiber base material using a film or nonwoven fabric of thermoplastic resin under the conditions described above include compression molding machine and double belt press. The compression molding machine is a batch type machine, and an improved productivity can be achieved by using an intermittent type press system equipped with two or more units installed in parallel for heating and cooling. The double belt press is a continuous type machine, and it can achieve a high productivity because continuous processing can be performed easily.

A typical method for producing the porous structure material described above is heating and expanding the fiber reinforced resin described above, though the present invention is not particularly limited to this method. As a good procedure for this method, for example, the impregnation with a thermoplastic resin and heating for expanding the fiber reinforced resin are performed simultaneously in a production process. In the case of a production process that uses a precursor as an intermediate, a reinforcing fiber base material is impregnated with a thermoplastic resin and a precursor is produced through a step for cooling it in a compressed state, followed by reheating the precursor to produce a porous structure material. Compared to this, in the case of a process in which the impregnation with a thermoplastic resin and heating for expansion are performed simultaneously, a porous structure material can be produced in one step with a high productivity because expansion is performed without cooling in a compressed state after impregnating the reinforcing fiber base material with the thermoplastic resin by heating. The heating for expanding the fiber reinforced resin is preferably performed at a temperature equal to or higher than the melting point or Tg of the thermoplastic resin. Here, if the heating for expanding the fiber reinforced resin is performed at a temperature excessively high above the melting point of the thermoplastic resin, the thermoplastic resin is likely to suffer decomposition or degradation, and therefore, it is preferably performed at or below a temperature higher by 150° C., preferably by 100° C., than the melting point of the thermoplastic resin.

EXAMPLES

The present invention will be described in more detail below with reference to Examples.

<Resins to Use>

The resins used were those listed below.

Polypropylene resin 1: manufactured by Japan Polypropylene Corporation, long chain branched polypropylene resin WAYMAX (registered trademark) MFX6, produced by polymerizing propylene with a metallocene catalyst (with strain-hardening feature, branching index 0.91)

Polypropylene resin 2: manufactured by Prime Polymer Co., Ltd., linear random polypropylene resin Prime Polypro (registered trademark) J3021GR (without strain-hardening, branching index 1.0)

Polystyrene resin 1: manufactured by Toyo Styrene Co., Ltd., polystyrene resin Toyostyrol HMT1 (with strain-hardening, branching index 0.67)

<Methods for Measuring Physical Property Values>

(1) Measurement of Extensional Viscosity of Thermoplastic Resin

The strain-hardening feature of a thermoplastic resin was evaluated based on extensional viscosity measurement performed at a strain rate of 1/sec and at a temperature higher by 30° C. than the melting point in the case of a crystalline resin or at a temperature higher by 80° C. than Tg in the case of an amorphous resin. The measuring equipment used was Melten Rheometer, manufactured by Toyo Seiki Co., Ltd.

(2) Melt Storage Modulus and Complex Viscosity of Thermoplastic Resin

The melt storage modulus and the complex viscosity of each thermoplastic resin used was measured according to ISO6721-10(1999). Five measurements were taken (n=5) at a temperature higher by 30° C. than the melting point. The measuring equipment used was dynamic mechanical analyzer ARESG2, manufactured by TA Instruments, equipped with parallel plates as measuring jig.

(3) Melt Flow Rate (MFR) of Thermoplastic Resin

The melt flow rate of each thermoplastic resin used was measured by the method described in the present Description. Five measurements were taken (n=5) and the average was used for evaluation. The measuring equipment used was Melt Indexer, manufactured by Toyo Seiki Co., Ltd.

(4) Measurement of Melting Point of Thermoplastic Resin

The melting point of each thermoplastic resin used was measured according to JIS K7121(1987). For the measurement, heating was performed at a rate of 10° C./min. The measuring equipment used was differential scanning calorimeter DSC 2500, manufactured by TA Instruments.

(5) Evaluation of Structure and Void Area of Porous Structure Material

A cross-sectional specimen was cut out in the thickness direction of a porous structure material with a cutter and observed by SEM (accelerating voltage 0.9 kV, magnification 200×), and a cross-sectional photograph taken was analyzed to make an evaluation. In the cross-sectional photograph, the areas of 300 regions (n=300) that contained no observable resin or fiber were measured to make an evaluation. The SEM used was VHX-D510, manufactured by Keyence Corporation.

(6) Compression Modulus of Porous Structure Material

Except for using a test piece having a size of 20 mm length×20 mm width×4 mm thickness, the compression modulus (MPa) of each porous structure material was measured as specified in ISO844(2004). Five measurements were taken (n=5) and the average was used for evaluation. The measuring instrument used was an Instron 5565 type universal testing machine, manufactured by Instron Japan Co., Ltd.

(7) Flexural Strength and Flexural Modulus of Porous Structure Material

The flexural strength and flexural modulus of each porous structure material was measured according to ISO178 (1993). Five measurements were taken (n=5) and the average was used for evaluation. The measuring instrument used was an Instron 5565 type universal testing machine, manufactured by Instron Japan Co., Ltd.

<Materials>

[Carbon Fiber Base Material]

A continuous carbon fiber bundle containing a total of 12,000 filaments was prepared by spinning a polymer containing polyacrylonitrile as primary component, followed by calcination. The continuous carbon fiber bundle was treated with a sizing agent by the immersion method and dried in heated air at a temperature of 120° C. to provide a carbon fiber bundle. This carbon fiber bundle had characteristics as described below.

Monofilament diameter: 7 μm
Weight per unit length: 0.8 g/m
Density: 1.8 g/cm$^3$
Tensile strength: 4.2 GPa
Tensile modulus of elasticity: 230 GPa
Sizing agent: polyoxyethylene oleyl ether
Quantity of sizing agent applied: 1.5 wt % relative to 100 wt % of carbon fiber bundle Each carbon fiber bundle prepared as described above was cut to a fiber length of 3 mm with a cartridge cutter to provide chopped carbon fiber bundles. An aqueous dispersion liquid with a 0.1 wt % concentration of a surface active agent (polyoxyethylene lauryl ether (trade name), manufactured by Nacalai Tesque, Inc) was prepared and this dispersion liquid was supplied along with the chopped carbon fiber bundles to a papermaking machine to produce a carbon fiber base material.

The papermaking machine was equipped with a dispersion tank, papermaking tank, and transport portion that connects the dispersion tank and the papermaking tank. The dispersion tank is equipped with a stirrer to disperse the dispersion liquid and the chopped carbon fiber bundles fed therein. The papermaking tank is equipped with a mesh conveyor that has a papermaking face at the bottom, and a conveyor that can convey the resulting paper-like carbon fiber base material was connected to the mesh conveyor. The papermaking step was carried out in a dispersion liquid in which the fiber concentration was adjusted to 0.05 wt %. The resulting paper-like carbon fiber base material was dried in a drying furnace at 200° C. Then, an aqueous dispersion liquid with a 3 wt % concentration of a binder (POLYMENT (registered trademark) SK-1000, manufactured by Nippon Shokubai Co., Ltd.), which was adopted as binder, was sprayed over the top face of the carbon base material being conveyed on the conveyor. After removing the surplus binder by suction, it was dried in a drying furnace at 200° C.

to produce a carbon fiber base material. The resulting carbon fiber base material had an areal weight of 110 $g/m^2$.

[Polypropylene Resin Film 1]

The polypropylene resin 1 (WAYMAX (registered trademark) MFX6, manufactured by Japan Polypropylene Corporation), which is a polypropylene resin having long chain branched structures, was sandwiched between release film sheets and compressed at 220° C. for 10 minutes in a press molding machine provided with a spacer, and then it was taken out along with the release film sheets, followed by cooling and solidifying the resin to produce a polypropylene resin film 1 having an areal weight of 165 $g/m^2$, Then, the melting point of the PP film 1 was measured and found to be 156° C.

[Polypropylene Resin Film 2]

A 50:50 by weight blend of the polypropylene resin 1 (WAYMAX (registered trademark) MFX6, manufactured by Japan Polypropylene Corporation), which is a polypropylene resin having long chain branched structures, and the polypropylene resin 2 (Prime Polypro (registered trademark) J3021GR, manufactured by Prime Polymer Co., Ltd.) was prepared and compounded in an extruder. The compound resin was sandwiched between release film sheets and compressed at 220° C. for 10 minutes in a press molding machine provided with a spacer, and then it was taken out along with the release film sheets, followed by cooling and solidifying the resin to produce a polypropylene resin film 2 having an areal weight of 165 $g/m^2$. Then, the melting point of the PP film 2 was measured and found to be 153° C.

[Polypropylene Resin Film 3]

A 25:75 by weight blend of the polypropylene resin 1 (WAYMAX (registered trademark) MFX6, manufactured by Japan Polypropylene Corporation), which is a polypropylene resin having long chain branched structures, and the polypropylene resin 2 (Prime Polypro (registered trademark) J3021GR, manufactured by Prime Polymer Co., Ltd.) was prepared and compounded in an extruder. The compound resin was sandwiched between release film sheets and compressed at 220° C. for 10 minutes in a press molding machine provided with a spacer, and then it was taken out along with the release film sheets, followed by cooling and solidifying the resin to produce a polypropylene resin film 3 having an areal weight of 165 $g/m^2$. Then, the melting point of the PP film 3 was measured and found to be 152° C.

[Polypropylene Resin Film 4]

A 10:90 by weight blend of the polypropylene resin 1 (WAYMAX (registered trademark) MFX6, manufactured by Japan Polypropylene Corporation), which is a polypropylene resin having long chain branched structures, and the polypropylene resin 2 (Prime Polypro (registered trademark) J3021GR, manufactured by Prime Polymer Co., Ltd.) was prepared and compounded in an extruder. The compound resin was sandwiched between release film sheets and compressed at 220° C. for 10 minutes in a press molding machine provided with a spacer, and then it was taken out along with the release film sheets, followed by cooling and solidifying the resin to produce a polypropylene resin film 4 having an areal weight of 165 $g/m^2$. Then, the melting point of the PP film 4 was measured and found to be 151° C.

[Polypropylene Resin Film 5]

The polypropylene resin 2 (Prime Polypro (registered trademark) J3021GR, manufactured by Prime Polymer Co., Ltd.) was sandwiched between release film sheets and compressed at 220° C. for 10 minutes in a press molding machine provided with a spacer, and then it was taken out along with the release film sheets, followed by cooling and solidifying the resin to produce a polypropylene resin film 5 having an areal weight of 165 $g/m^2$. Then, the melting point of the PP film 5 was measured and found to be 150° C.

[Polystyrene Resin Film 1]

The polystyrene resin 1 (Toyostyrol GP HMT1, manufactured by Toyo Styrene Co., Ltd.), which is a polystyrene resin having long chain branched structures, was sandwiched between release film sheets and compressed at 240° C. for 10 minutes in a press molding machine provided with a spacer, and then it was taken out along with the release film sheets, followed by cooling and solidifying the resin to produce a polystyrene resin film 1 having an areal weight of 193 $g/m^2$. Then, the Tg of the polystyrene resin film 1 was measured and found to be 103° C.

Example 1

A porous structure material was prepared using a carbon fiber base material and the polypropylene resin film 1. The carbon fiber base material and the polypropylene resin film were cut into sheets having a size of 300 mm×300 mm and they were stacked in the order of [polypropylene resin film 1/carbon fiber base material/polypropylene resin film 1/carbon fiber base material/polypropylene resin film 1/carbon fiber base material/polypropylene resin film 1]. This laminate was sandwiched between release film sheets and compressed in a press molding machine at 180° C. under 5 MPa for 10 minutes to impregnate the carbon fiber base material with the polypropylene resin. Subsequently, the laminate was transferred to another press molding machine and subjected to cool pressing at 40° C. under 5 MPa until it cooled sufficiently to prepare a fiber reinforced resin.

Then, the fiber reinforced resin was sandwiched between release film sheets and compressed in a press molding machine at 180° C. under 3 MPa for 10 minutes to melt the polypropylene resin present in the fiber reinforced resin. Subsequently, the laminate was transferred to another press molding machine provided with a spacer and subjected to cool pressing at 40° C. under 5 MPa until it cooled sufficiently to provide a porous structure material. The spacer inserted in the press molding machine allows the fiber reinforced resin to be expanded by a restoring force that is attributed to the elastic force of the carbon fiber base material, leading to the formation of a porous structure.

In the resulting porous structure material, the polypropylene resin was expanded without breakage and accordingly, the polypropylene resin formed muscle-like structures between fibers, serving to realize good mechanical properties and large weight reduction.

Example 2

Except for replacing the polypropylene resin film 1 with the polypropylene resin film 2, the same procedure as in Example 1 was carried out to prepare a porous structure material.

In the resulting porous structure material, the polypropylene resin was expanded without breakage and accordingly, the resin formed muscle-like structures between fibers, serving to realize good mechanical properties and large weight reduction. Furthermore, the polypropylene resin was also high in flowability and accordingly, the impregnation of the carbon fiber base material with the polypropylene resin was realized in a desirable manner.

Example 3

Except for replacing the polypropylene resin film 1 with the polypropylene resin film 3, the same procedure as in Example 1 was carried out to prepare a porous structure material.

In the resulting porous structure material, the polypropylene resin was expanded without breakage and accordingly, the polypropylene resin formed muscle-like structures between fibers, serving to realize good mechanical properties and large weight reduction. Furthermore, the polypropylene resin was also high in flowability and accordingly, the impregnation of the carbon fiber base material with the polypropylene resin was realized in a desirable manner.

Example 4

Except for replacing the polypropylene resin film 1 with the polypropylene resin film 4, the same procedure as in Example 1 was carried out to prepare a porous structure material.

In the resulting porous structure material, the polypropylene resin was expanded without breakage and accordingly, the polypropylene resin formed muscle-like structures between fibers, serving to realize good mechanical properties and large weight reduction. Furthermore, the polypropylene resin was also high in flowability and accordingly, the impregnation of the carbon fiber base material with the polypropylene resin was realized in a desirable manner.

Example 5

A porous structure material was prepared using a carbon fiber base material and the polystyrene resin film 1. The carbon fiber base material and the polystyrene resin film were cut into sheets having a size of 300 mm×300 mm and they were stacked in the order of [polystyrene resin film 1/carbon fiber base material/polystyrene resin film 1/carbon fiber base material/polystyrene resin film 1/carbon fiber base material/polystyrene resin film 1], This laminate was sandwiched between release film sheets and compressed in a press molding machine at 240° C. under 5 MPa for 10 minutes to impregnate the carbon fiber base material with the polystyrene resin. Subsequently, the laminate was transferred to another press molding machine and subjected to cool pressing at 40° C. under 5 MPa until it cooled sufficiently to prepare a fiber reinforced resin.

Then, the resulting fiber reinforced resin was sandwiched between release film sheets and compressed in a press molding machine at 180° C. under 3 MPa for 10 minutes to melt the polystyrene resin present in the fiber reinforced resin. Subsequently, the laminate was transferred to another press molding machine provided with a spacer and subjected to cool pressing at 40° C. under 5 MPa until it cooled sufficiently to provide a porous structure material. The spacer inserted in the press molding machine allows the fiber reinforced resin to be expanded by a restoring force that is attributed to the elastic force of the carbon fiber base material, leading to the formation of a porous structure.

In the resulting porous structure material, the polystyrene resin was expanded without breakage and accordingly, the polystyrene resin formed muscle-like structures between fibers, serving to realize good mechanical properties and large weight reduction.

Comparative Example 1

Except for replacing the polypropylene resin film 1 with the polypropylene resin film 5, the same procedure as in Example 1 was carried out to prepare a porous structure material.

In the resulting porous structure material, the polypropylene resin was broken during expansion, and the resin failed to form muscle-like structures between fibers, leading to inferior mechanical properties in spite of large weight reduction.

Comparative Example 2

Except that the chopped CF used in the carbon fiber base material had a fiber length of 0.5 mm, the same procedure as in Example 1 was carried out to prepare a porous structure material. However, the precursor for the porous structure material failed to have a sufficient expansion force and failed to expand to the intended expansion ratio, making it impossible to prepare a sample.

TABLE 1

| | | | unit | Example 1 | Example 2 | Example 3 | Example 4 | Example 5 | Comparative example 1 | Comparative example 2 |
|---|---|---|---|---|---|---|---|---|---|---|
| thermoplastic resin | presence/absence of resin having long chain branched structure | | — | present | present | present | present | present | absent | absent |
| | storage modulus ratio G'(0.01)/G'(0.001) | | — | 6.0 | 9.0 | 13.5 | 16.7 | 3.5 | 24.3 | 6.0 |
| | complex viscosity η(0.001) | | Pa · s | 23,470 | 8,810 | 4,860 | 3,110 | 60,100 | 1,450 | 23,470 |
| | MFR | | g/10 min | 4.2 | 9.2 | 15.2 | 20.6 | 1.6 | 24.6 | 4.2 |
| | presence/absence of strain-hardening feature (strain-hardening rate 1.1 or more) | | — | present | present | present | present | present | absent | present |
| | strain-hardening rate | | — | 9.0 | 4.2 | 1.9 | 1.3 | 7.4 | 1.0 | 9.0 |
| reinforcing fiber | type of reinforcing fiber | | — | CF | CF | CF | CF | CF | CF | CF |
| | fiber length | more than 10 mm | wt % | 0 | 0 | 0 | 0 | 0 | 0 | 0 |
| | | 2 or more and 10 mm or less | wt % | 70 | 73 | 75 | 75 | 70 | 76 | 0 |
| | | less than 2 mm | wt % | 30 | 27 | 25 | 25 | 30 | 24 | 100 |
| | Lw/Ln | | | 1.18 | 1.17 | 1.15 | 1.15 | 1.18 | 1.14 | 1.17 |
| fiber reinforced resin | expansion ratio (B) | | fold | 4.0 | 4.0 | 4.0 | 4.0 | 4.0 | 4.0 | — |
| | bulk specific gravity (ρ) | | — | 0.26 | 0.26 | 0.26 | 0.26 | 0.30 | 0.26 | — |
| | true specific gravity | | — | 1.03 | 1.04 | 1.03 | 1.04 | 1.21 | 1.04 | — |
| | presence/absence of muscle-like structure | | — | present | present | present | present | present | absent | — |
| | Muscle-likestructure extending continuously over 300 μm or more | | — | ○ | ○ | ○ | x | ○ | — | — |
| | void area rate (A) in cross-sectional photograph | | % | 23 | 26 | 30 | 33 | 27 | 37 | — |

TABLE 1-continued

| | unit | Example 1 | Example 2 | Example 3 | Example 4 | Example 5 | Comparative example 1 | Comparative example 2 |
|---|---|---|---|---|---|---|---|---|
| A/B | — | 5.8 | 6.5 | 7.6 | 8.3 | 6.7 | 9.3 | — |
| average void area | $\mu m^2$ | 3,700 | 4,700 | 5,500 | 5,900 | 4,600 | 6,300 | — |
| variation in average void area | % | 71 | 84 | 96 | 105 | 80 | 111 | — |
| compression modulus | MPa | 59 | 38 | 30 | 21 | 42 | 12 | — |
| flexural strength | MPa | 27 | 25 | 23 | 20 | 25 | 16 | — |
| flexural modulus (Ec) | GPa | 2.7 | 2.5 | 2.2 | 1.9 | 2.8 | 1.6 | — |

EXPLANATION OF NUMERALS

1. reinforcing fiber monofilament (a)
2. reinforcing fiber monofilament (b)
3. reinforcing fiber monofilament (b)
4. reinforcing fiber monofilament (b)
5. reinforcing fiber monofilament (b)
6. two dimensional orientation angle
7. reinforcing fiber
8. thermoplastic resin
9. void
10. muscle-like structure of thermoplastic resin

The invention claimed is:

1. A fiber reinforced resin comprising a reinforcing fiber base material and a thermoplastic resin, wherein reinforcing fibers having fiber lengths of 2 mm or more and 10 mm or less account for 50 or more and 100 or less wt % of the total weight, which accounts for 100 wt %, of the reinforcing fibers present in the reinforcing fiber base material, the thermoplastic resin has long chain branched structures, and the reinforcing fiber base material has a three-dimensional network structure formed of the reinforcing fibers.

2. The fiber reinforced resin as set forth in claim 1, wherein the melt complex viscosity $\eta(0.001)$ is 3,500 [Pa·s] or more and is measured at a frequency of 0.001 Hz and at a temperature higher by 30° C. than the melting point in the case where the thermoplastic resin is a crystalline resin or at a temperature higher by 80° C. than Tg in the case where it is an amorphous resin.

3. The fiber reinforced resin as set forth in claim 1, wherein the ratio G'(0.01)/G'(0.001) of the melt storage modulus G'(0.01) at a frequency of 0.01 Hz to the melt storage modulus G'(0.001) at a frequency of 0.001 Hz is 15 or less when measured at a temperature higher by 30° C. than the melting point in the case where the thermoplastic resin is a crystalline resin or at a temperature higher by 80° C. than Tg in the case where it is an amorphous resin.

4. The fiber reinforced resin as set forth in claim 1, wherein the ratio Lw/Ln between the weight average fiber length (Lw) and the number average fiber length (Ln) of the reinforcing fibers is 1 or more and 1.4 or less.

5. The fiber reinforced resin as set forth in claim 1, wherein the reinforcing fibers account for 3 or more and 60 or less vol % relative to the total volume of the reinforcing fibers and the thermoplastic resin.

6. The fiber reinforced resin as set forth in claim 1, wherein the thermoplastic resin has long chain branched structures and has a branching index of 0.5 or more and 0.95 or less.

7. The fiber reinforced resin as set forth in claim 1, wherein the thermoplastic resin has long chain branched structures and has a branching index of 0.8 or more and 0.95 or less.

8. The fiber reinforced resin as set forth in claim 1, wherein the thermoplastic resin has a melt flow rate of 1.0 g/10 min or more and 40 g/10 min or less according to JIS K7210:2014.

9. The fiber reinforced resin as set forth in claim 1, wherein the reinforcing fiber base material is in the form of nonwoven fabric.

10. The fiber reinforced resin as set forth in claim 1, wherein the reinforcing fiber base material is in a compressed state and is immobilized in the thermoplastic resin and also wherein the fiber reinforced resin is expandable when heated at or above a temperature higher by 20° C. than the melting point in the case where the thermoplastic resin is a crystalline resin or at a temperature higher by 100° C. than Tg in the case where it is an amorphous resin.

11. The fiber reinforced resin as set forth in claim 1, wherein the thermoplastic resin is a polyolefin based resin or a polystyrene based resin.

12. A porous structure material of the fiber reinforced resin as set forth in claim 1, wherein the thermoplastic resin present in meshes of the three-dimensional network structure of the reinforcing fiber base material forms binding structures that bind the reinforcing fibers together and wherein voids are formed as regions that are surrounded by the reinforcing fibers and/or the thermoplastic resin and that contain neither the reinforcing fibers nor the thermoplastic resin.

13. The porous structure material as set forth in claim 12 wherein the the binding structures formed of the thermoplastic resin extend continuously over 300 μm or more.

14. Molded members at least partly formed of the porous structure material as set forth in claim 12.

15. Molded members at least partly formed of the fiber reinforced resin as set forth in claim 1.

* * * * *